(12) United States Patent
Vahasoyrinki et al.

(10) Patent No.: US 9,138,892 B2
(45) Date of Patent: Sep. 22, 2015

(54) COMPACT MICROMANIPULATOR

(75) Inventors: Mikko Vahasoyrinki, Oulu (FI); Mikko Lempea, Tyrnava (FI)

(73) Assignee: Sensapex Oy, Oulu (FI)

( * ) Notice: Subject to any disclaimer, the term of this patent is extended or adjusted under 35 U.S.C. 154(b) by 388 days.

(21) Appl. No.: 13/505,938

(22) PCT Filed: Nov. 6, 2009

(86) PCT No.: PCT/FI2009/050898
§ 371 (c)(1),
(2), (4) Date: May 3, 2012

(87) PCT Pub. No.: WO2011/055000
PCT Pub. Date: May 12, 2011

(65) Prior Publication Data
US 2012/0217843 A1 Aug. 30, 2012

(51) Int. Cl.
H02N 2/00 (2006.01)
B25J 7/00 (2006.01)
H02N 2/02 (2006.01)
G02B 21/32 (2006.01)

(52) U.S. Cl.
CPC . *B25J 7/00* (2013.01); *H02N 2/025* (2013.01); *G02B 21/32* (2013.01)

(58) Field of Classification Search
USPC ........... 310/328, 323.02, 323.17, 323.18, 348
See application file for complete search history.

(56) References Cited

U.S. PATENT DOCUMENTS

| 4,894,579 | A | * | 1/1990 | Higuchi et al. | ............... 310/328 |
| 6,424,077 | B1 | * | 7/2002 | Hata et al. | ..................... 310/328 |
| 2005/0006986 | A1 | | 1/2005 | Kallio et al. | |
| 2005/0023930 | A1 | | 2/2005 | Petrenko | |

FOREIGN PATENT DOCUMENTS

| GB | 2227603 A | 8/1990 |
| JP | 7314358 A | 12/1995 |
| JP | 2001260095 A | 9/2001 |
| JP | 2008225201 A | 9/2008 |

* cited by examiner

*Primary Examiner* — Thomas Dougherty
*Assistant Examiner* — Karen B Addison
(74) *Attorney, Agent, or Firm* — Ziegler IP Law Group LLC

(57) ABSTRACT

A compact micromanipulator system has a micromanipulator element that cause movement of a tool attached to the micromanipulator element. The micromanipulator element is attached to a support structure, which in turn is attached to a sliding base in a hinged manner to allow sliding and/or tipping of the micromanipulator element away from the normal operating position of the micromanipulator element.

5 Claims, 7 Drawing Sheets

COMPACT MICROMANIPULATOR

FIELD

The aspects of the disclosed embodiments generally relate to controlling a tool in a micromechanical fashion, and in particular to a micromanipulator system for use in biomedical applications, a micromanipulator element and a micromanipulator element stack.

BRIEF DESCRIPTION OF RELATED DEVELOPMENTS

Actuators utilizing micromechanical principles such as piezoelectric drive provide for advantages in biosciences, where precise manipulation of microscopic tools is needed. The piezoelectric principle allows to control the position of a tool attached to the piezoelectric drive with small increments, and combining multiple piezoelectric drives makes it possible to manipulate the tool in multiple directions.

Before the micromanipulator can be used to achieve the target precisely, the tool head (the piezoelectric drive) needs to be placed adequately close to the target. In practical studies, the tool needs to be changed every now and then, for example when a microelectrode tool stops working as regularly happens in the course of study. All this should be achieved in a small space, since the working area around a microscopic target is limited and many large devices cannot be fitted into the working area.

The current solutions for manipulating a tool in a microscopic manner do not fulfil these needs completely. Many devices are clumsy to operate and large, and yet they may display significant drift of the tool position over time, or lack desired accuracy. The large size also means that these devices need to be placed far away from the manipulation target, which further means that long tool holders or tools are required to reach the target. There is, therefore, a need for a solution that alleviates these challenges.

SUMMARY

Now there has been invented an improved method and technical equipment implementing the method, by which the above problems are alleviated. Various aspects of the disclosed embodiments include a system, an apparatus and a method, which are characterized by what is stated in the independent claims. Various embodiments of the invention are disclosed in the dependent claims.

The micromanipulator system in the disclosed embodiments may have a support structure that may be easily movable for example for changing the tool, and may be locked in place with the help of magnets. The magnets may be released with the help of wedge-shaped elements that move the magnets further away from the yoke, thereby making it easier to move the parts in relation to each other. The micromanipulator stack may have a structure, where manipulator elements can be mounted directly to each other without adjustment pieces. For example, the first manipulator may be mounted on the moving part of the second manipulator sideways to make it unnecessary to use an L-shaped adjustment piece and thereby making the system simpler and smaller. The micromanipulators may be constructed such that the moving part of the micromanipulator has optimal dimensions so that it stays stable on the drive rods, but is shaped and sized so that it is reasonably small and fits inside the micromanipulator and allows a large movement in relation to its size.

According to a first aspect, there is provided a micromanipulator element comprising at least one piezoelectric element that is connected to a moving element. According to an example embodiment the piezoelectric element is connected to a stem, and a moving element attached to the stem of the at least one piezoelectric element, where the moving element has been attached to the stem with a predetermined force. According to an example embodiment, the moving element comprises an upper and a lower part, and the predetermined force is arranged to be created by applying a spring force to push the upper and the lower part together. According to an example embodiment, the moving element comprises a groove adapted to receive the stem of the piezoelectric element. According to an example embodiment, the stem of the piezoelectric element being attached to a groove may act as a linear guide for the moving element and, therefore, no separate ball bearing guides may be required. According to an example embodiment, the piezoelectric element is arranged to be driven with a pulse sequence or a sawtooth sequence, to cause a movement of the moving element of the micromanipulator element. The movable element may be attached to another type of a drive than a piezoelectric element and its stem, for example a squiggle element where the movable element moves along a stem due elliptic oscillating movement of the stem, or a leg-type element, where the movable element moves along the stem due to alternating back-and-forth movement of small "legs" on the stem.

According to a second aspect, there is provided a micromanipulator element stack comprising at least a first and a second micromanipulator element, where the first element is mounted on a moving part of the second element, and the first element is mounted sideways in relation to the second element.

According to an example embodiment, the micromanipulator element stack comprises a first micromanipulator element, a second micromanipulator element and a third micromanipulator element. The first micromanipulator element is mounted on a moving part of the second micromanipulator element from the side, and the second micromanipulator element is mounted on a moving part of the third micromanipulator element from the bottom. According to an example embodiment, the first micromanipulator element and the second micromanipulator element comprise two piezoelectric elements with stems, and the stems of the first micromanipulator element are essentially next to each other vertically while the stems of the second micromanipulator element are essentially next to each other horizontally. The terms vertical and horizontal should be understood in relative sense only, that is, they should be understood so that the rods are displaced on different planes that may be essentially orthogonal to each other.

According to a third aspect, there is provided a micromanipulator system, the system comprising a micromanipulator element, the micromanipulator element being adapted to cause movement of a tool when attached to the micromanipulator element, and the micromanipulator element being attached to a support structure, the support structure being attached to a base where the support structure is arranged to be connected to said base in a hinged manner to allow tipping of the micromanipulator element away from the normal operating position of the micromanipulator element.

According to an example embodiment, the support structure is attached to a rail on the base with help of a magnet. According to an example embodiment, the micromanipulator system comprises a magnet release mechanism whereby a wedge-shaped element is arranged to be movable to create a gap between magnet and the yoke element when moved.

According to an example embodiment, the magnet release mechanism is moved with the help of a stem, a button, a screw or an eccentric wheel. According to an example embodiment, the support structure comprises at least one rotational element to allow rotation of the support structure around an essentially vertical axis. According to an example embodiment, the support structure comprises at least one rotational element to allow rotation of around an essentially horizontal axis. According to an example embodiment, the at least one rotational element is arranged to be locked in position with a screw-like element. According to an example embodiment, the support structure comprises at least one slidable element to allow sliding an upper part of the support structure along an essentially vertical axis. According to an example embodiment, the support structure comprises at least one slidable element to allow sliding at least part of the support structure along an essentially horizontal axis.

According to a fourth aspect there is provided a method for manipulating a tool attached to a micromanipulator system according to any example embodiments, wherein a piezoelectric element in the micromanipulator system is driven for example with a pulse sequence or a sawtooth sequence to cause a movement of the tool.

According to an example embodiment, the piezoelectric element in the micromanipulator system is driven with a pulse sequence and the pulse ratio is adapted to change the speed of the movement of the tool.

According to a fifth aspect there is provided a computer program product for manipulating a tool in a micromanipulator system, the system comprising at least one processor, the computer program product comprising computer program code that, when run on the processor, causes the processor to execute the method according to the example embodiments.

BRIEF DESCRIPTION OF THE DRAWINGS

In the following, various example aspects of the disclosed embodiments will be described in more detail with reference to the appended drawings, in which.

DETAILED DESCRIPTION OF THE DISCLOSED EMBODIMENTS

In the following, several aspects of the disclosed embodiments will be described in the context of a system for micromanipulation. It is to be noted, however, that the disclosed embodiments are not merely limited to such a system. In fact, the different embodiments have applications in any environment where moving objects with precision is needed.

Figure 1:
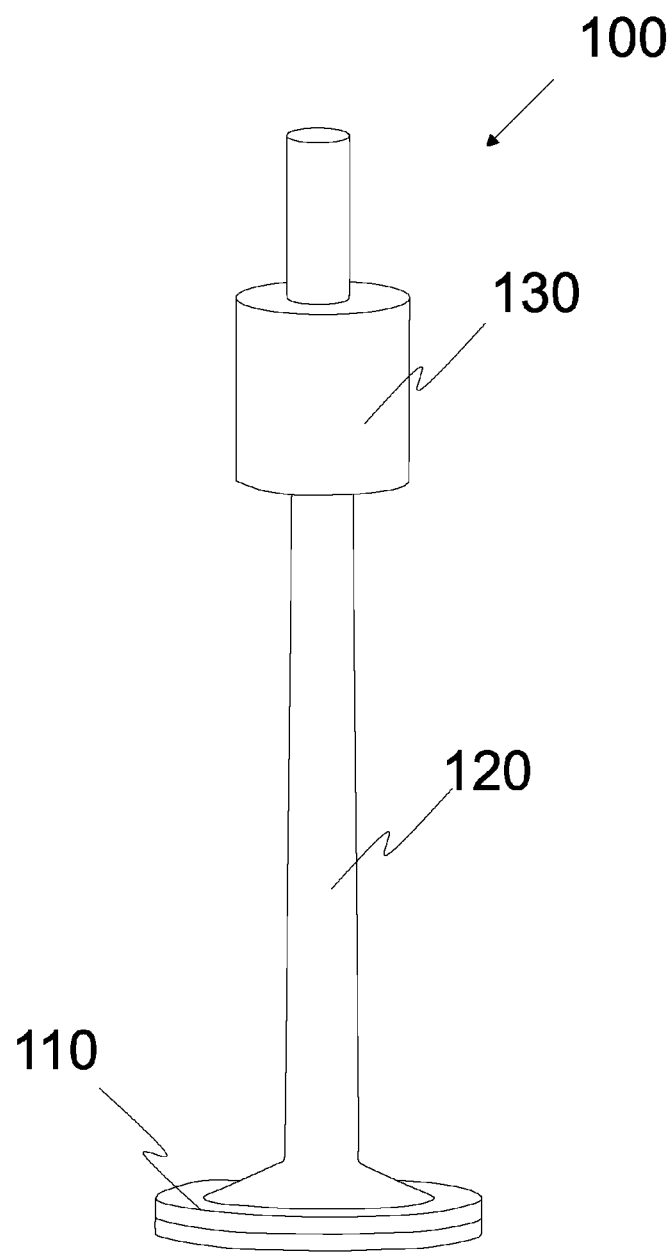
FIG. 1 shows a piezoelectric element for manipulating a position of a tool attached to the moving part of the piezoelectric element according to an example embodiment.

FIG. 1 shows an advantageous example embodiment of piezoelectric element for manipulating a position of a tool attached to the moving part of the piezoelectric element. The piezoelectric element 100 may comprise a piezoelectric component 110 connected to a stem or rod 120. The piezoelectric component 110 may change shape when an electric voltage is applied across the component. Since the component 110 is attached to components that do not change shape, an alternating electric voltage causes a vibration that may be passed to the stem 120. The vibration may cause a travelling wave in the rod 120, and/or it may cause a standing wave to the extent it is reflected from the end of the rod. There may be a moving component movably attached to the rod. The attachment of the movable component may be such that there considerable friction between the movable element 130 and the rod 120.

When the rod moves fast due to the vibration and/or wave in the rod, the inertia of the movable element may keep it essentially in place, and when the rod moves slowly, the movable element may move essentially with the movement of the underlying rod. In addition, since the friction between the movable element and the rod may be larger when the rod is at rest in relation to the movable element, the first movement of the rod after a resting period may cause a larger movement in the movable element that a subsequent movement of the rod when the rod is already in motion relative to the movable element. These effects may cause the movable element to move a short distance along the rod during every cycle of the vibration. It may therefore become possible to cause a movement of the movable element 130 by applying an alternating voltage across the piezoelectric component 110. Such alternating voltage may have the shape of a triangular sawtooth, or it may have the shape of a pulse train, or it may have some other shape. The leading edges of the waveform may have a slower rate of change than the trailing edges so that the rising edge of each wave takes more time to reach the target voltage than it takes for the falling edge to come down. These relations may be reversed, or the leading and trailing edges may have the same rate of change. The pulse ratio or the waveform may be adapted to change the speed of the movement.

Elements that utilize the piezoelectric principle as described above according to an example embodiment where there is a moving element attached to a rod or a stem and the moving element travels along the rod or stem may generally be called linear piezoelectric elements. Such elements are manufactured, for example by Piezoelectric Technology Co in Korea as described in the patent publications U.S. 2007/0120442 and PCT/KR05/00353. Different types of linear piezoelectric elements are manufactured by plurality of manufacturers, for example but not limited to New Scale Technologies Inc., and these can be incorporated to the micromanipulator element with necessary accompanying changes to it instead of the linear piezoelectric drive presented according to the example embodiment. For example, the movable element may be attached to another type of a drive than a piezoelectric element and its stem, for example a squiggle element where the movable element moves along a stem due elliptic oscillating movement of the stem, or a leg-type element, where the movable element moves along the stem due to alternating back-and-forth movement of small "legs" on the stem.

Figure 2A:
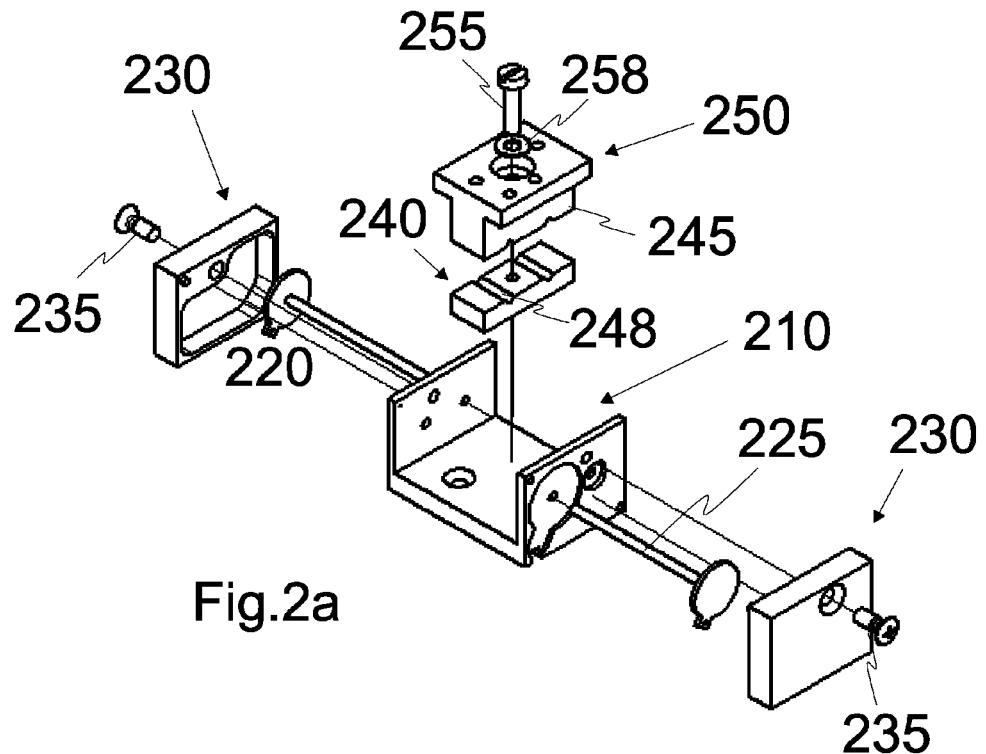
FIGS. 2a and 2b show a micromanipulator element for manipulating a tool in one direction according to an example embodiment.
Figure 2B:
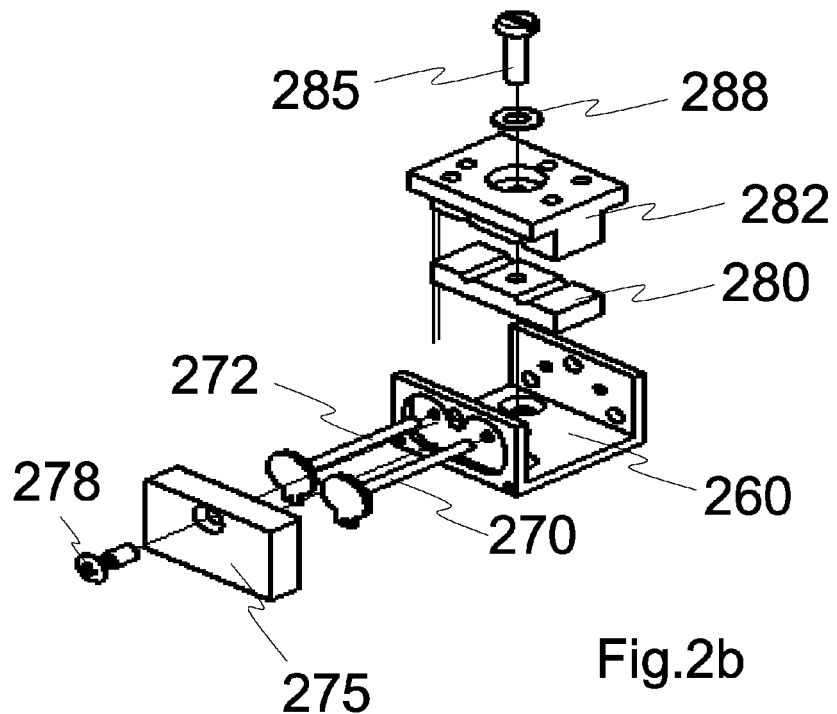

FIGS. 2a and 2b show a micromanipulator element for manipulating a tool in one direction according to an example embodiment. In FIG. 2a, the chassis 210 of the micromanipulator element is a U-shaped part that may have fittings and holes for holding the piezoelectric elements 220 and 225. The piezoelectric elements 220 and 225 may be placed in the chassis so that their rods are essentially parallel, and that the piezoelectric components of the elements 220 and 225 are on different sides of the chassis. The piezoelectric elements 220 and 225 may be held in place with elastic glue and casings 230 may be attached to the chassis with screws 235 to protect the elements and their electrical connections.

The movable element may comprise two or more parts 240 and 250. The parts of the movable element may have grooves 245 and 248 for fitting around the piezoelectric elements 220 and 225, respectively. The parts 240 and 250 may be pressed together with the help of a screw 255 that is loaded to a certain pressing force with the help of a spring 258. The force generated by such a spring may be of the order of a few Newtons, for example 3 Newtons, 6 Newtons or 10 Newtons, or it may be considerably higher, e.g. of the order of 100-1000 Newtons or lower, e.g. 0.1-1.5 Newtons, depending on application. The force generated by the spring creates a friction between the movable element and the rods of the piezoelectric elements, thereby allowing operation of the linear piezoelectric drive as described in reference to FIG. 1. It may be noted that the movable element may be attached to the rods of the piezoelectric elements essentially without separate ball bearing guides, which may allow simplicity in structure and smaller size. However, additional ball bearing guides parallel to the piezoelectric elements may be introduced to increase weight bearing capacity of the micromanipulator element. Other types of linear guides and bearing types may be used, as well.

A micromanipulator element may thereby for example be constructed using aluminium frame, aluminium sled, two piezoelectric elements fixed to graphite rods, which are glued with elastic glue to the frame and disc spring of elastic material. Graphite rods may be fixed to the frame with glue, and the two halves of the sled may be fixed together with a disc spring and screws. The micromanipulator element may utilize a piezoelectric component, or a magnetostrictive component, or another component allowing precise microscopic movement of the movable element. The micromanipulator element may be compact in size, and may not require bearings.

In FIG. 2b an embodiment for the micromanipulator element is shown. The element may have a chassis 260, piezoelectric elements 270 and 272, a casing 275 for holding the piezoelectric elements in place with the help of a screw 278. The movable element may comprise two or more parts 280 and 282 that may be held in place with the help of a screw 285 and a spring 288, as in FIG. 2a. The micromanipulator element of FIG. 2b. has the piezoelectric elements placed parallel to each other so that their piezoelectric components are on the same side of the chassis. This allows the attachment of the chassis 260 from the other side more easily, for example to construct a micromanipulator element stack so that one of the elements is attached sideways in relation to the other elements.

Figure 3A:
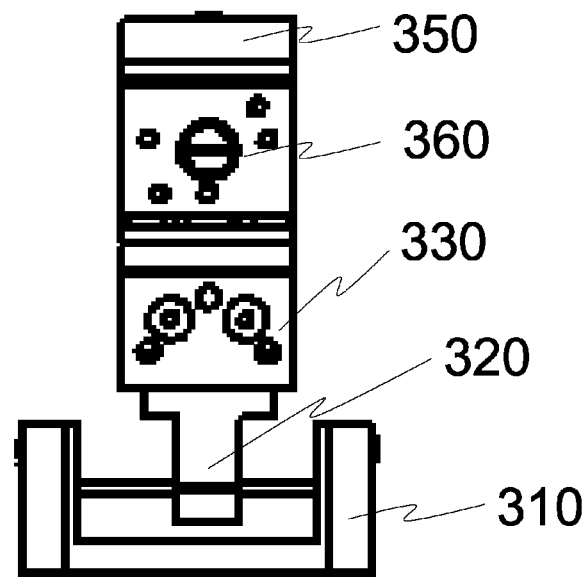
FIGS. 3a and 3b show a micromanipulator element stack for manipulating a tool in multiple directions according to an example embodiment.
Figure 3B:
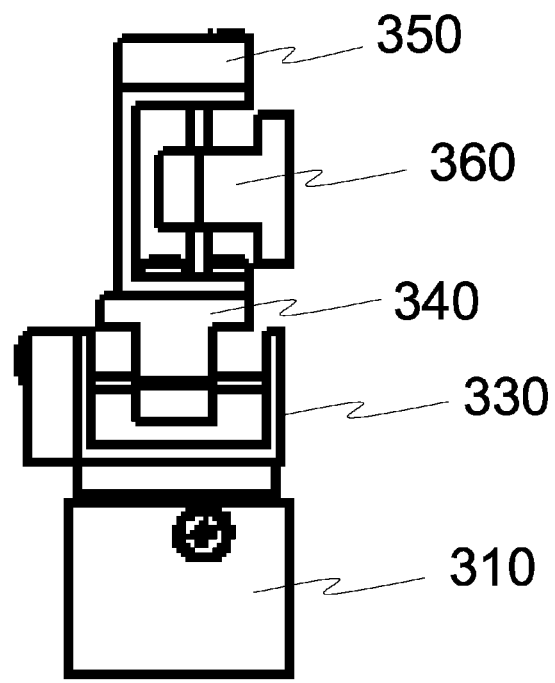

FIGS. 3a and 3b show a micromanipulator element stack from two different directions for manipulating a tool in multiple directions according to an example embodiment. The last (third) micromanipulator element 310 on the stack provides for movement along a first axis, say the x-direction, by moving the movable element 320 along the rods or stems of the piezoelectric components. The last element 310 may have a relatively large movement of the movable element 320 in relation to the other micromanipulator elements 330 and 350. The last micromanipulator element 310 may be fixed to the support structure with the help of e.g. screws, glue, magnets or other means of attachment. The second micromanipulator element 330 may be attached to the movable element 320 of the first micromanipulator element 310 directly e.g. with the help of screws or other means of attachment. The second micromanipulator element 330 provides for movement along a second axis, say the y-axis.

The first micromanipulator element 350 may be attached to the movable part 340 of the second micromanipulator element 330. The first micromanipulator element 350 may be attached sideways from the side of the chassis to the movable part 340. Such an arrangement may make it possible to omit an adjustment piece (L-piece) between the first and the second micromanipulator element, which would be needed if the first micromanipulator element 350 were only attachable from the bottom of the chassis. The movable element 360 of the first micromanipulator element 350 may move along a third axis, say the z-axis, an essentially vertical axis in this figure. The axes of movement of the different micromanipulator elements in the stack may be essentially orthogonal to each other, or they may create non-orthogonal angles with each other. The stack may comprise one, two, three or more micromanipulator elements. A tool may be attached to the first micromanipulator element.

Figure 4:
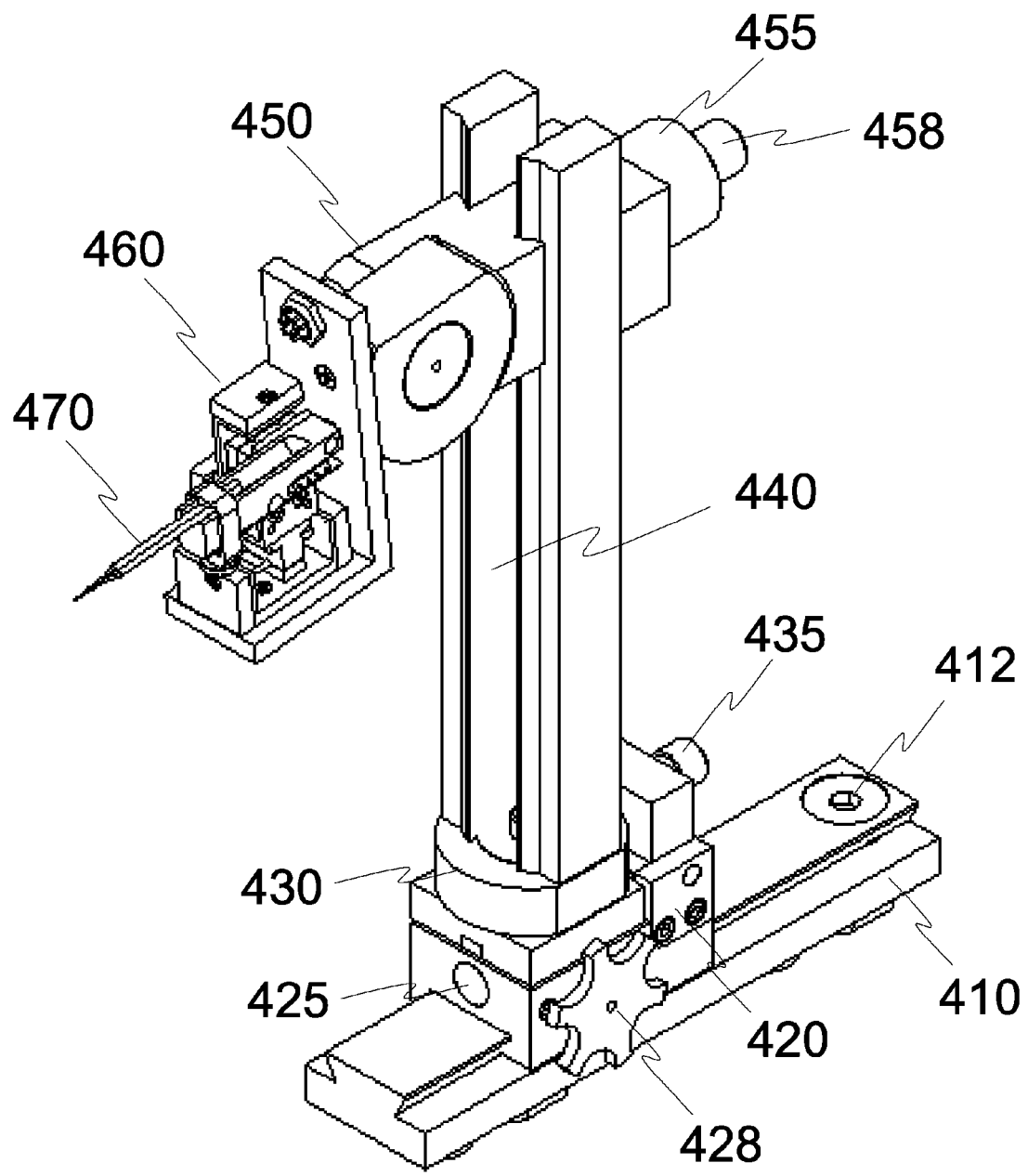
FIG. 4 shows a micromanipulator system for manipulating a tool according to an example embodiment.

FIG. 4 shows a micromanipulator system for manipulating a tool according to an example embodiment. The micromanipulator system may comprise or be attached to a rail 410 for moving the tool 470 towards and away from the target. The rail 410 may be attached to the table with the help of magnets, that may be releasable from a screw 412 or other releasing means. It may also be attached to the table with bolts if the table is non-magnetic. The sliding base 420 of the system may be also attached to the rail 410 with the help of magnets, or with the help of a locking screw operated by a turn wheel 428. The base 420 may comprise a hinged structure allowing the tipping of the upper part of the system away from the target. The hinged structure may be held in place with the help of magnets that are releasable from a knob 425. Tipping the upper part away from the target may allow for easy access to the part holding the tool 470 e.g. for changing or adjusting the tool. Accessing the tool may also be facilitated by sliding the base from front to the back position on the rail, and these two positions can be set for example by limiting stops placed on the rail.

Attached onto the base, there may be a rotatable element 430 that can be turned after releasing the element from the screw 435. The element 430 allows turning the upper part of the system around an essentially vertical axis. On the element 430, there may be a rail structure 440 or other structure allowing the movement of the upper part of the system up and down along the rail. This up and down movement may be prevented or allowed by using a screw 455 to tighten the upper part to the rails 440. The system may also comprise a rotatable element 450 to allow for rotation of the micromanipulator stack 460 around an essentially horizontal axis. The rotatable element 450 may have a sawtooth-like outer surface towards the rail structure 440, and it may be locked or freed from the screw 458, which may have e.g. a triangular shaped end that may provide a fit to the sawtooths. At the end of the system, there may be a micromanipulator stack 460 with a tool 470 attached thereon. The tool may be attached directly to the micromanipulator stack or it may be attached with the help of a tool holder.

The example embodiment system of FIG. 4 and its mechanical structure and solutions may allow for better functionality required by the different applications of the system. For example, the example embodiment system may have a simple structure to achieve low manufacturing cost of the system. The system may be relatively small in size. The system may have tighter tolerances that those presently known, and it may have a smaller drift of the tool position, and/or the position of the tool may stay the same for a longer time. High stability and small size may be advantageous for the micromanipulator system. This is because vibrations from the environment or caused by the user handling the equipment may not be mediated to the tool as strongly and the smaller size avoids amplifying the vibrations. The drift and shaking of the tool position may therefore be smaller or essentially avoided. Long lever arms in systems according to known technology may effectively amplify the vibrations caused by the or conducted from the environment. The system may be attached to a table that has capacity to restrict vibrations from the building, e.g. the table may have dampers in or under the legs, and/or the table may be significantly heavy, e.g. made of stone or steel.

Figure 5A:
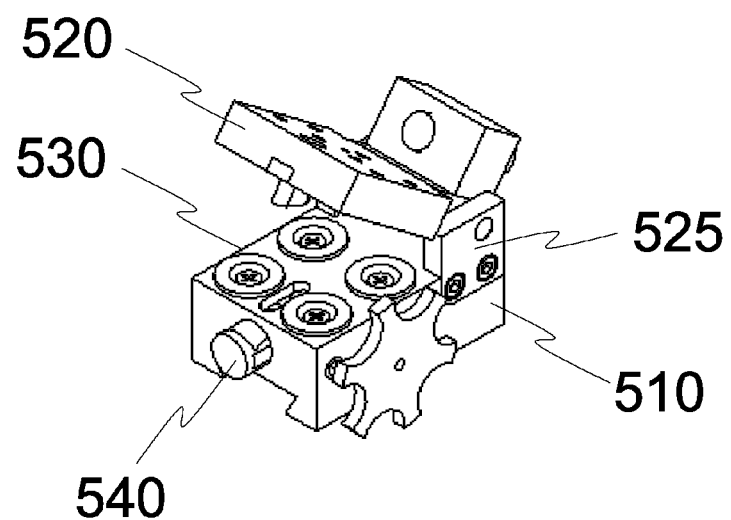
FIGS. 5a and 5b show an arrangement for connecting the vertical element of the micromanipulator system to the base element of the system in a hinged manner for easy access to the tool.
Figure 5B:
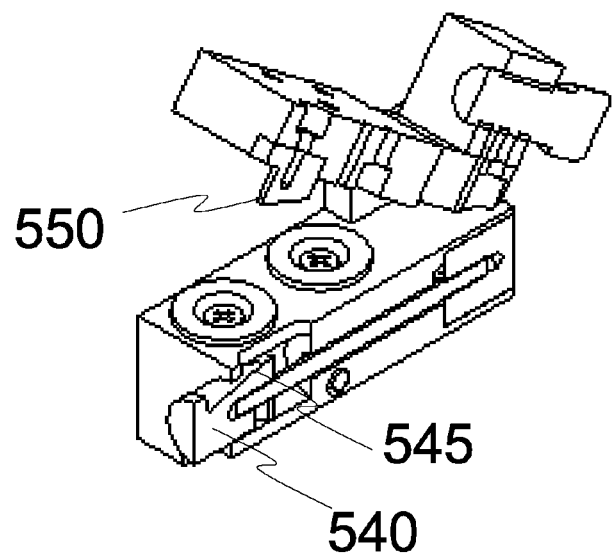

FIGS. 5a and 5b show an arrangement for connecting the vertical element of the micromanipulator system to the base element of the system in a hinged manner for easy access to the tool. The hinged element 510 (420) may have a structure, whereby it comprises two parts and turnably connected to each other, e.g. with the help of a hinge 525. The upper part 520 may be held in place with the help of magnets 530. The magnets may be releasable by pulling or pushing a knob 540, whereby a stem connected to the knob moves a wedge-shaped element 540 in relation to another wedge-shaped element 550 in the upper part 520. This movement lifts the upper part 520 so that the magnetic force created by the magnets 530 between the magnets and the yoke 520 is eased, and the element 510 can be tipped around the hinge 525.

Figure 6:
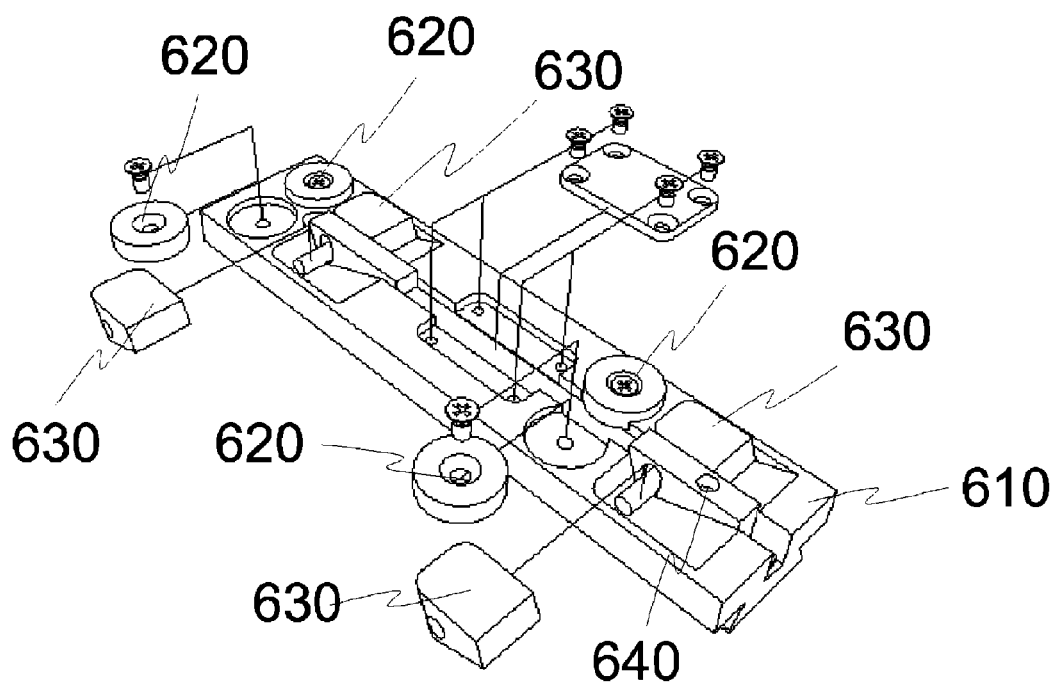
FIG. 6 shows the attachment of the base element of the micromanipulator system to the table.

FIG. 6 shows the attachment of the base element of the micromanipulator system to the table. The base element 610 may be attached to the table (made of suitable magnetically conducting material) with the help of magnets 620. The magnets 620 create a force that pulls the magnets to the table acting as a yoke. The base element 610 may comprise wedge-shaped parts 630 in a wedge-shaped groove. The parts 630 may be movable with the help of a moving element 640 they are attached to. When the parts 630 move in their groove, the wedge-shaped structure lifts the base element 610 up from the table thereby easing the magnetic force created by the magnets 620 towards the table. This allows moving the base element and thereby the whole system on the table. The base element may also incorporate openings through it that may allow bolting it to the table that is manufactured from magnetically non-conducting material. The base element may also have suction elements to allow attaching the element to the table by a suction force.

Figure 7:
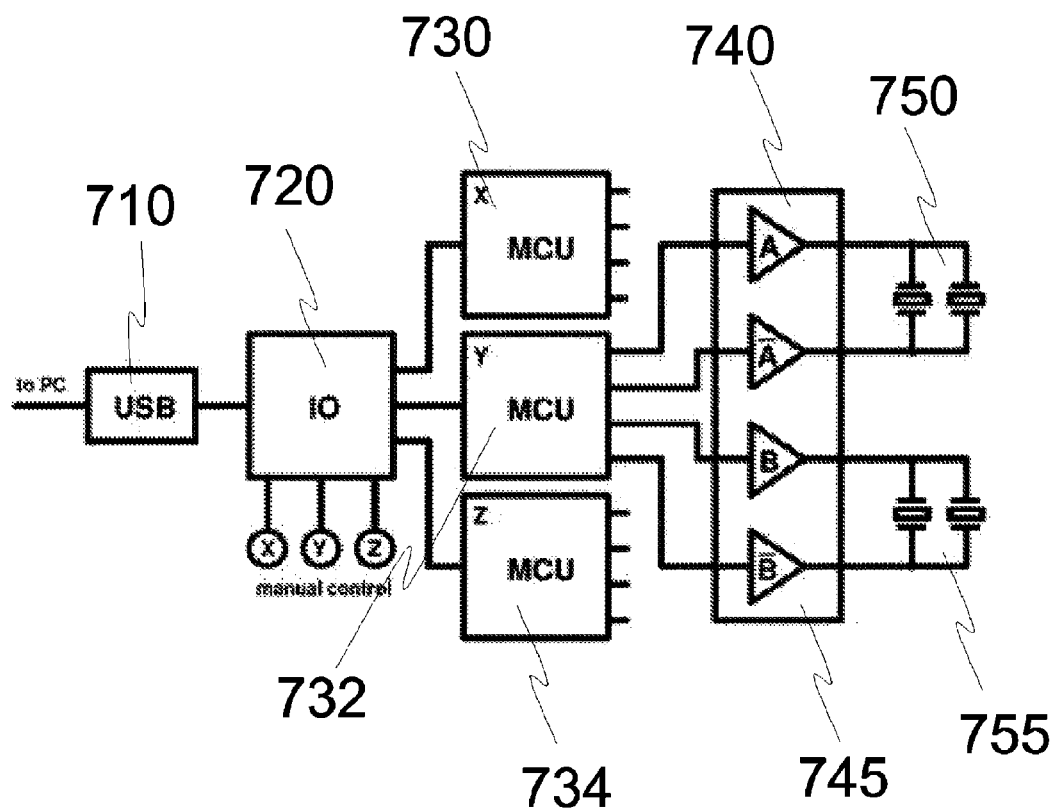
FIG. 7 shows a schematic diagram of control electronics of the micromanipulator according to an example embodiment.

FIG. 7 shows a schematic diagram of control electronics of the micromanipulator according to an example embodiment. The electronics may comprise an I/O section 720 to allow input/output operations to and from a computer and/or a user, thereby allowing manual or computer-steered control. The connection to the computer may be realized using a suitable bus connection 710, e.g. a universal serial bus (USB) or FireWire connection. The electronics may comprise controller units 730, 732 and 734 for the different micromanipulator elements of a micromanipulator element stack. The controller units may be connected to the piezoelectric components 750 and 755 of the micromanipulator units through amplifiers 740 and 745, respectively.

The basic functionality of the driving electronics and software is illustrated in FIG. 7. The driver circuits may be commercial stepper motor drivers controlled by embedded software. The software may enable control of the pulse count and pulse frequency by computer or they may be controlled by manual switches. The control unit can create various control waveforms such as, sawtooth wave or rectangular waveform or other more complicated waveforms.

The control units or an external controller attached to the control electronics may comprise computer program code that cause the control electronics to apply suitable signals to the micromanipulator elements or that facilitate easy steering of the control electronics. The features of the control electronics may therefore be augmented by software. For example, controls for manipulating the tool along different micromanipulator element stack axes and controlling the movement speed of the tool may be implemented by software. Operating and home positions of the manipulator may also be programmed into a memory. The position and speed of the tool may also be displayed with the help of software.

The control unit may be implemented as a modular rack setting where different modules, controls and display are placed in a casing, and the control unit has a hand control unit for moving the tool and for most common controls. The control unit may also be implemented as a box module with integrated controls, and/or with a remote control. The micromanipulator elements may be controlled with rotary switches, buttons, e.g. switches with a membrane, or a joystick control. One control unit may be arranged to control a plurality of micromanipulators.

The different aspects of the disclosed embodiments may offer advantages over known solutions. For example, the micromanipulator element may have a large operational range of 8 mm for a size of 21×14×16 mm or an operational range of 17 mm for micromanipulator element of size 33×17× 18 mm. Such sizes may be approximately 50% of the size of the known solutions. A driving force of 1.3 N of the micromanipulator was measured against a force gauge (Lutron FG-5000A). A 3.4 N holding force was measured in a similar manner. The system may be able to tolerate a relatively high perpendicular load to the micromanipulator elements, thereby reducing the need to use separate ball bearing guides. The maximum torque was measured by fixing threaded rod to the sled and adding movable weight to it. The sled movement stopped when the parallel torque exceeded 21 Nmm and the perpendicular torque exceeded 23.5 Nmm. The ball bearing guides can be incorporated to the micromanipulator element if an application requires larger load and/or torque bearing capacity. A perpendicular load may have a relatively small effect to the manipulator step size. The step size may be essentially constant over the operating area. Fast movement of the tool (several cm/s) may be achieved. The micromanipulator may be inert and stable in position when powered off. The micromanipulator system may cause relatively small electric interference.

The micromanipulator may have the property of very low slipping or drift from the set position. A slipping or drift is often a problem with mechanical and hydraulic micromanipulators or generally all micromanipulators with poorer mechanical design. The drift of the micromanipulator was measured by placing a force close to maximum driving force (1.2N/1.3N) along the movement axis. After 17 hours there was no measurable drift with a measurement resolution of 1 µm. Some aspects of the disclosed embodiments may achieve a 1 µm absolute accuracy in position.

The various aspects of the disclosed embodiments may have different applications in fields where precise manipulation of objects is needed. The disclosed embodiments may have biomedical applications where biological samples are studied under a microscope, for example in electrophysiology, where electrical activity of cells are measured; in in vitro fertilization, where sperm is injected to an egg; and in stem cell and genetic research where genetic material is transferred from one cell to another. The disclosed embodiments may also be applied to optics, where optical elements are moved with it or in microelectronics, where manipulation of small electronic components may be achieved e.g. for forming or severing connections of circuits. The disclosed embodiments may also be used in automation applications, where computer controlled compact micromanipulators are needed, for example in on-chip diagnostics. The disclosed embodiments may also be applied in surgery, where precise and stable manipulation of surgical tools is needed.

The various aspects of the disclosed embodiments can be implemented with the help of computer program code that resides in a memory and causes the relevant apparatuses to carry out the disclosed embodiments. For example, a micromanipulator system device and a micromanipulator element may comprise circuitry and electronics for handling, receiving and transmitting data, computer program code in a memory, and a processor that, when running the computer program code, causes the device to carry out the features of an embodiment. Yet further, a controller computer may comprise circuitry and electronics for handling, receiving and transmitting data, computer program code in a memory, and a processor that, when running the computer program code, causes the controller computer to carry out the features of an embodiment.

It is obvious that the present invention is not limited solely to the above-presented embodiments, but it can be modified within the scope of the appended claims.

What is claimed is:

1. A compact micromanipulator element comprising
   at least one movable element;
   a first piezoelectric element;
   a second piezoelectric element;
   a stem of the first piezoelectric element and a stem of the second piezoelectric element being arranged in parallel to each other;
   the stem of the first piezoelectric element and the stem of the second piezoelectric element forming linear guides for the movable element thereby reducing the need of a separate linear guide for the movable element.

2. A micromanipulator according to claim 1, wherein the movable element comprises an upper and a lower part, and a predetermined force to attach the movable element to the first stem and the second stem is arranged to be created by applying a spring force to push the upper and the lower part together.

3. A micromanipulator according to claim 2, wherein the movable element comprises two parallel grooves configured to receive the stem of the first piezoelectric element and the stem of the second piezoelectric element, respectively.

4. A micromanipulator according to claim 1, wherein the movable element is arranged to be movable with sub-micrometer resolution over a range of at least 8 millimeters while the total volume occupied by the micromanipulator element is less than 5000 cubic millimeters.

5. A micromanipulator element stack comprising at least a first micromanipulator element and a second micromanipulator element according to claim 1, the first micromanipulator element being mounted on a moving part of the second micromanipulator element, the first micromanipulator element being mounted sideways in relation to the second micromanipulator element, the first micromanipulator element and the second micromanipulator element both comprising two piezoelectric elements with stems, and the stems of the first micromanipulator element being essentially on top of each other while the stems of the second micromanipulator element being essentially next to each other horizontally.

* * * * *